United States Patent
Au et al.

(10) Patent No.: US 6,643,636 B1
(45) Date of Patent: Nov. 4, 2003

(54) OPTIMIZING A QUERY USING A NON-COVERING JOIN INDEX

(75) Inventors: Grace Kwan-On Au, Rancho Palos Verdes, CA (US); Ahmad Said Ghazal, Redondo Beach, CA (US); Paul Laurence Sinclair, Manhattan Beach, CA (US)

(73) Assignee: NCR Corporation, Dayton, OH (US)

( * ) Notice: Subject to any disclaimer, the term of this patent is extended or adjusted under 35 U.S.C. 154(b) by 310 days.

(21) Appl. No.: 09/874,804

(22) Filed: Jun. 5, 2001

(51) Int. Cl.[7] .............................................. G06F 17/30
(52) U.S. Cl. ........................................................ 707/2
(58) Field of Search ........................ 707/2, 3, 4, 103 R, 707/8

(56) References Cited

U.S. PATENT DOCUMENTS

| | | | | |
|---|---|---|---|---|
| 5,241,648 A | * | 8/1993 | Cheng et al. .................. 707/7 |
| 5,440,730 A | * | 8/1995 | Elmasri et al. ............. 707/203 |
| 5,675,819 A | * | 10/1997 | Schuetze ..................... 704/10 |
| 5,848,408 A | * | 12/1998 | Jakobsson et al. ............. 707/3 |
| 5,870,747 A | * | 2/1999 | Sundaresan ................. 707/101 |
| 5,991,754 A | * | 11/1999 | Raitto et al. ................... 707/2 |
| 6,505,188 B1 | * | 1/2003 | Ghazal et al. ................. 707/2 |
| 6,567,802 B1 | * | 5/2003 | Popa et al. ..................... 707/3 |

* cited by examiner

Primary Examiner—Safet Metjahic
Assistant Examiner—Sana Al-hashemi
(74) Attorney, Agent, or Firm—Baker Botts L.L.P.

(57) ABSTRACT

A method, database system and computer program are disclosed for optimizing a SQL query, in which the SQL query includes a WHERE clause and a FROM clause. An evaluation is done to determine whether a non-covering join index partially but not completely covers the query. If it does, the join index is added to the FROM clause of the query without removing the partially covered base tables and the WHERE clause of the query is modified by: (1) mapping a query condition to the join index for its partially covered base tables; and (2) adding a join back condition from the join index to a base table from which the join index was formed.

33 Claims, 3 Drawing Sheets

OPTIMIZING A QUERY USING A NON-COVERING JOIN INDEX

BACKGROUND

Relational database systems store data in tables organized by columns and rows. The tables typically are linked together by "relationships" that simplify the storage of data and make complex queries against the database more efficient. Structured Query Language (or SQL) is a standardized language for creating and operating on relational databases.

A relational database system typically includes an "optimizer" that plans the execution of SQL queries. For example, if a query requires accessing or "joining" more than two tables, the optimizer will select the order that the tables are joined to produce the requested result in the shortest period of time or to satisfy some other criteria.

In some cases, a database administrator may define a "join index" that contains one or more frequently accessed columns from one or more tables. The optimizer has a choice of accessing columns from the join index or from the base table or tables from which the data in the join index was selected. Consequently, the join index gives the optimizer additional "join paths" that it can follow in planning query execution.

Typically, an optimizer considers a join index to execute a query if it "covers" the query, that is, if the join index includes all of the columns selected by the query that are in the base tables of the join index. This means that in order for a join index to be applicable for different queries against a common set of frequently used tables, a database administrator may define a join index that has all the columns needed by these queries, perhaps resulting in a very large join index. Otherwise, the optimizer will not use the join index to execute some queries.

SUMMARY

An optimization technique is provided that allows the use of non-covering join indexes to satisfy queries. This is accomplished, for example, by recognizing if a primary key from one or more of the base tables is included in a join index and, if so, using it to join back to the base table for the missing columns.

In general, in one aspect, the invention features a method for optimizing a SQL query, in which the SQL query includes a WHERE clause and a FROM clause. The method includes evaluating whether a non-covering join index partially but not completely covers the query. If it does, the method includes adding the join index to the FROM clause of the query without removing the partially covered base tables and modifying the WHERE clause of the query by: (1) mapping a query condition to the join index for its partially covered base tables; and (2) adding a join back condition from the join index to a base table from which the join index was formed.

Implementations of the invention may include one or more of the following. The method may include evaluating the cost of a plurality of different join paths to implement the query, the difference in at least some of the join paths being at least partially attributed to an order of the join back condition in the respective join paths. The method may include selecting the least costly of the plurality of different join paths. The non-covering join index may be recognized to have a unique column that can be used to join back to a base table of the join index efficiently. Adding the join back condition may include adding a predicate to the WHERE clause which tests for equality between the unique column of the base table and the corresponding unique column included in the join index. The unique column may be a rowid column, a primary index column, or a secondary index column.

The FROM clause of the query may specify one or more tables, including one or more base tables. The entire query may reference a entire-query set of columns from the one or more base tables of the join index. The WHERE clause of the query may reference a where-clause set of columns from the one or more base tables of the join index. The join index may be defined by selecting columns from the one or more base tables. The method may further include recognizing that the non-covering join index provides partial but not complete coverage by determining that the join index does not contain all of the entire-query set of columns and determining that the join index contains a subset of the where-clause set of column. Recognizing that the non-covering join index provides partial but not complete coverage may include determining that the join index includes a primary key for each of the one or more base tables from which the join index was formed that are not completely covered. The primary key included in the join index for at least one of the base tables may be a rowid, a unique primary index, or a unique secondary index.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities; and an optimizer for optimizing a plan for executing a query. The query includes a FROM clause and a WHERE clause. The optimizer includes a process for evaluating whether a non-covering join index partially but not completely covers the query, and if it does, adding the join index to the FROM clause of the query without removing the partially covered base tables. The optimizer further includes a process for modifying the WHERE clause of the query by (1) mapping a query condition to the join index for its partially covered base tables; and (2) adding a join back condition from the join index to a base table from which the join index was formed.

In general, in another aspect, the invention features a computer program, stored on a tangible storage medium, for use in optimizing a query including a FROM clause and a WHERE clause. The program including executable instructions that cause a computer to evaluate whether a non-covering join index partially but not completely covers the query. If it does, the program includes executable instructions that cause a computer to add the join index to the FROM clause of the query without removing the partially covered base tables, and to modify the WHERE clause of the query by (1) mapping a query condition to the join index for its partially covered base tables; and (2) adding a join back condition from the join index to a base table from which the join index was formed.

Other features and advantages will become apparent from the description and claims that follow.

DETAILED DESCRIPTION

Figure 1:
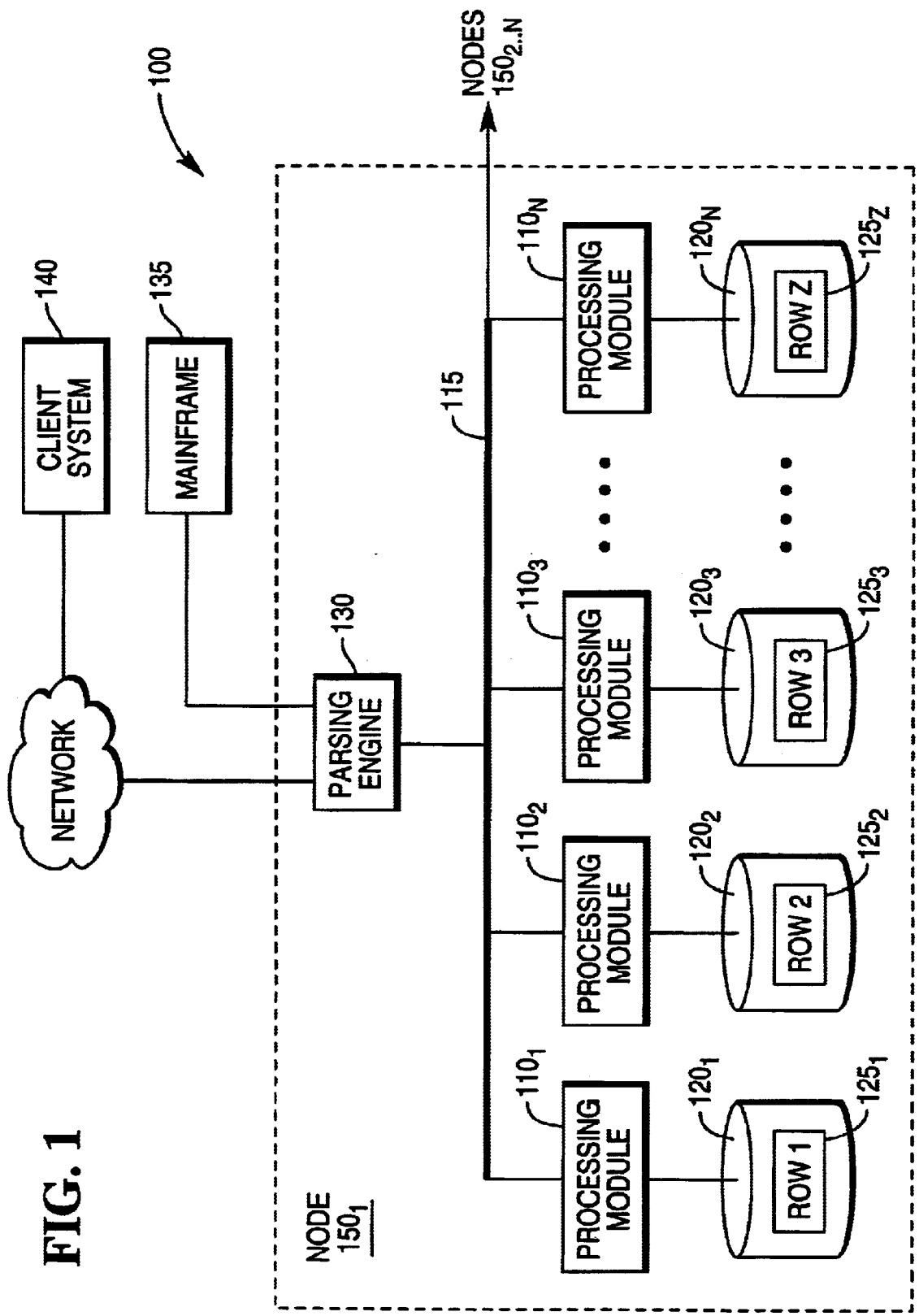
FIG. 1 is a block diagram of a node of a database system.

The query optimization technique disclosed herein has particular application to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_1$ . . . N, connected by a network 115 that manage the storage and retrieval of data in data-storage facilities $120_1$ . . . N. Each of the processing modules $110_1$ . . . N may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1$ . . . N manages a portion of a database that is stored in a corresponding one of the data-storage facilities $120_1$ . . . N. Each of the data-storage facilities $120_1$ . . . N includes one or more disk drives. The DBS may include multiple nodes $105_2$ . . . N in addition to the illustrated node $105_1$, connected by extending the network 115.

The system stores data in one or more tables in the data-storage facilities $120_1$ . . . N. The rows $125_1$ . . . z of the tables are stored across multiple data-storage facilities $120_1$ . . . N to ensure that the system workload is distributed evenly across the processing modules $110_1$ . . . N. A parsing engine 130 organizes the storage of data and the distribution of table rows $125_1$ . . . z among the processing modules $110^1$ . . . N. The parsing engine 130 also coordinates the retrieval of data from the data-storage facilities $120_1$ . . . N in response to queries received from a user at a mainframe 135 or a client computer 140. The DBS 100 usually receives queries in a standard format, such as SQL.

Figure 2:
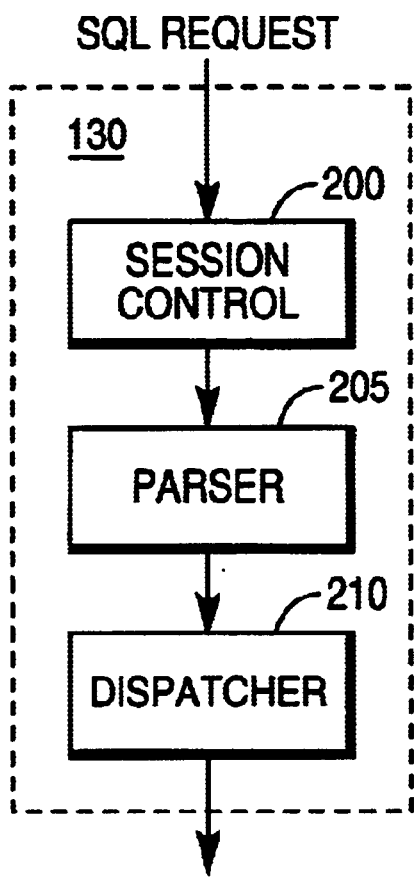
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
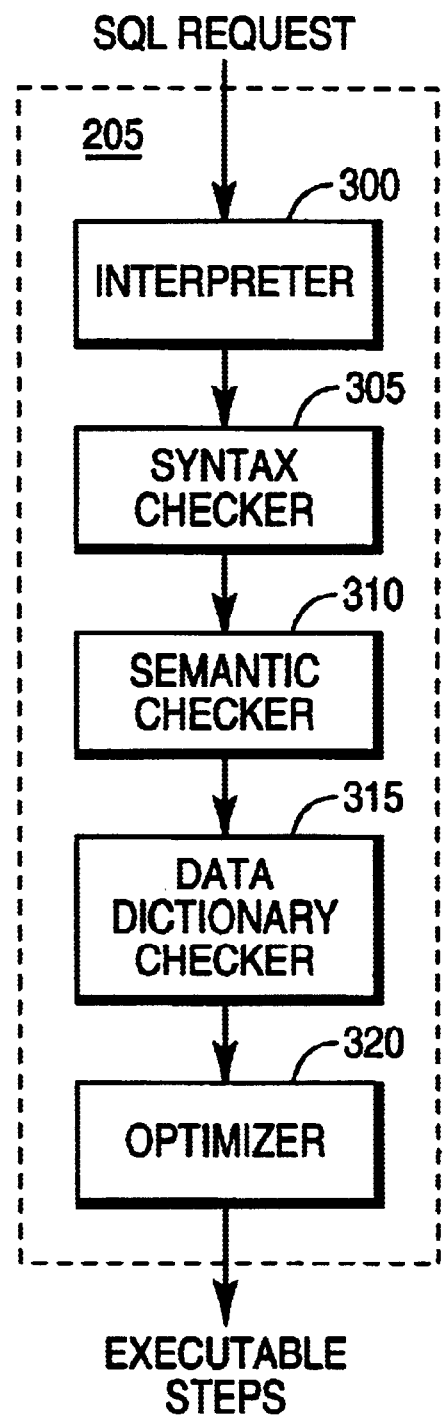
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320) that develops the least expensive plan to perform the request.

An important element of the Teradata Active Data Warehousing System available from NCR Corporation is the "primary index" column that the database system's user assigns for each table. The database system hashes the rows of each table using the primary index column as the basis for the hash and distributes the rows among the data storage facilities $120_1$ . . . N based on the hash results. If the primary index column is properly selected, the "distribution" technique evenly distributes the rows of each table across all of the data storage facilities $120_1$ . . . N in the system. This is especially true if the chosen primary index column has unique values, producing a unique primary index (UPI) and is less true if the chosen primary index column has non-unique values, producing a non-unique primary index (NUPI). The same hashing technique is used to retrieve rows of data from a table. The primary index provides a path to the rows of a table.

The Teradata Active Data Warehousing System also provides a secondary index capability that provides an alternative path to the rows of a table. A table can have more than one secondary index. Unlike a primary index, a secondary index does not affect the distribution of table rows among data storage facilities $120_1$ . . . N.

Even with the primary index, the hashing technique may not uniquely identify a particular row in a table. Consequently, each row has a row identification, or "rowid," included as a separate column. In one example system, the rowid includes a 32-bit row hash value, representing the result of hashing the primary index column for that row, and a 32-bit "uniqueness id." Together, the 32-bit row hash value and the 32-bit uniqueness id uniquely identify the row.

Figure 4:
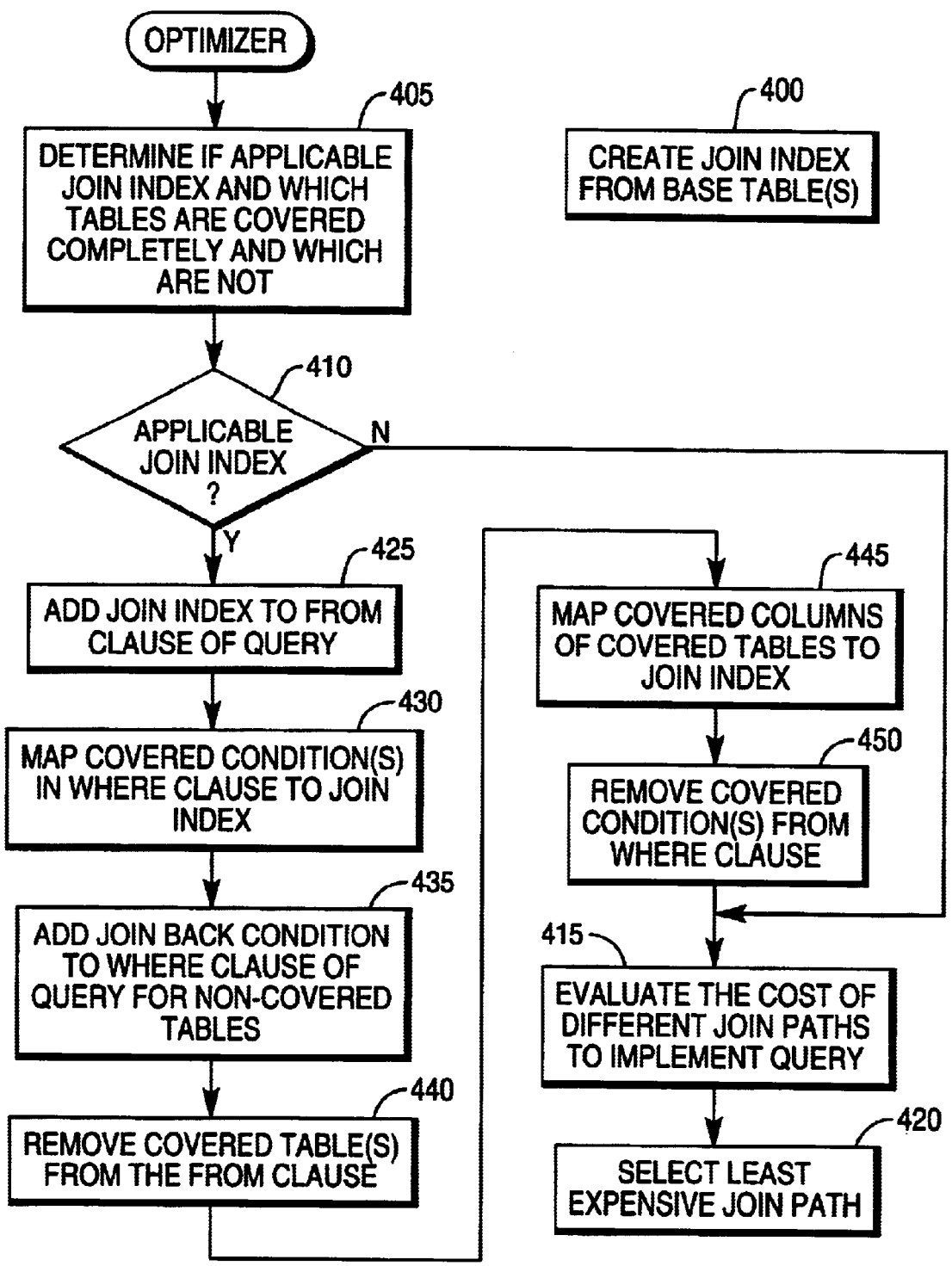
FIG. 4 is a flow chart of a technique for optimizing a query using a non-covering join index.

The optimizer includes an extended join index technique that supports a non-covering join index. A join index is said to be non-covering if it partially but not completely covers a query for the base tables from which the join index was formed. Thus, a join index is non-covering if: (a) it does not contain all the base table columns referenced by the entire query (i.e., those base table columns referenced in all clauses of the query) and (b) it contains a subset (i.e., some or all) of the base table columns referenced in the WHERE clause of the query. Moreover, for the base tables in the join index that are not completely covered by the join index for the query, the join index includes a "primary key" for those base tables. A primary key can be one of the following:

The rowid column (with or without the primary index column(s));

Columns that comprise the unique primary index;

Columns that comprise a unique secondary index (with or without the primary index column(s));

The optimizer's join index query rewrite algorithm manages partial mapping of a query's WHERE clause and the addition of a join condition that joins a non-covering join index back to its base table, as illustrated in FIG. 4. At some point in the processing, which may or may not be associated with processing of a particular query, a join index is created from one or more base tables (block 400). The join index is created, typically by a system administrator, by selecting frequently used columns from one or more base tables.

When it is time to execute a query, the optimizer first determines if the join index is an applicable join index (block 405). A join index is an applicable join index if it is either a covering join index or a non-covering join index, as defined above. If the join index is not an applicable join index (block 410), the query is executed as normal. The optimizer will evaluate the costs of different join paths to implement the query (block 415) and select the least expensive join path (block 420).

If the join index is an applicable join index, the optimizer adds the join index to the FROM clause of the query (block 425). The covered columns for base tables completely covered by the join index in the query are mapped to the join index (block 430). However, for tables that are not completely covered, this mapping only occurs for columns in the WHERE clause. Furthermore, for a non-covering join index, a join back condition is added to the WHERE clause of the query (block 435). In addition, as is usual for a join index, the covered tables are removed from the FROM clause (block 440), the covered columns of the covered tables are mapped to the join index (block 445), and covered conditions included in the join index are removed from the query (block 450). The optimizer will then evaluate and execute the query as described above (blocks 415 and 420).

For example, given two tables, T1 and T2, with the following data definitions:

T1 (a1 int, b1 int, c1 int, . . . ) primary index (a1);
T2 (a2 int, b2 int, c2 int, . . . ) primary index (a2);
and a single-table join index that is defined using rowid to provide the functionality of a non-covering index:
Create join index J1 as
Select T1.b1, T1.rowid (named Trowid) from T1
Primary Index (b1);
the following user query:
Select T2.a2, T2.c2, T1.a1, T1.c1, . . .
From T1, T2
Where T1.b1=T2.a2 and
T2.c2<100;
is rewritten as:
Select T2.a2, T2.c2, T1.a1, T1.c1, . . .
From T1, T2, J1
Where J1.b1=T2.a2 and
J1.Trowid=T1.rowid and
T2.c2<100;

In this case, J1 is a non-covering join index because it does not include all of the columns required by the query (T1.a1 and T1.c1, at least, are missing) but includes all or some of the base table columns that are referenced in the WHERE clause, and it includes the rowid field from T1. To incorporate the non-covering join index into the query, the technique added the non-covering join index (J1) to the FROM clause without removing its base table T1 and modified the query's WHERE clause by (1) only mapping the partially covered condition to the join index (J1.b1=T2.a2 in place of T1.b1=T2.a2), and (2) adding a join back condition (J1.Trowid=T1.rowid).

With the conventional usage of an index as an access path, the join back from an index to its base table takes place immediately following the evaluation of the qualified rowids from the index. The approach of adding a non-covering join index to the FROM clause without removing the base table and a join back condition to the WHERE clause of the original query results in additional join paths that the join planner can consider. Consequently, the join back from a non-covering join index to its base table is not restricted to be done in a certain order.

In queries where a non-covering join index can be used to replace the joins from a base table to multiple other tables, it is sometimes more efficient to join the join index with these tables first and then join the results back to the base table. For example, given another table T3 with the following definition:

T3 (a3 int, b3 int, c3 int, . . . ) primary index (a3);
and the following join index:
Create join index J2 as
Select T1.b1, T1.c1, rowid (named Trowid) from T1
Primary Index (b1);
The following user query:
Select T2.a2, T2.c2, T1.a1, T1.c1, T3.c3, . . .
From T1, T2, T3
Where T1.b1=T2.a2 and
T1.c1=T3.a3 and
T2.c2<100 and
T3.b3>10;
is rewritten as:
Select T2.a2, T2.c2, T1.a1, T1.c1, T3.c3, . . .
From T1, T2, T3, J2
Where J2.b1=T2.a2 and
J2.c1=T3.a3 and
J2.Trowid=T1.rowid and
T2.c2<100 and
T3.b3>10;

In this case, J2 is a non-covering join index because it does not include all of the columns required by the query (T1.a1, at least, is missing) but includes all or some of the base table columns that are referenced in the WHERE clause, and it includes the rowid field from T1. To incorporate the non-covering join index into the query, the technique added the non-covering join index (J2) to the FROM clause without removing its base table T1 and modified the query's WHERE clause by (1) only mapping the partially covered conditions to the join index (J2.b1=T2.a2, J2.c1=T3.a3 in place of T1.b1=T2.a2 and T1.c1=T3.a3, respectively), and (2) adding a join back condition (J2.Trowid=T1.rowid).

For the rewritten query, the join planner will consider a global join plan of (((T2 join J2) join T3) join T1) which can very well be the optimal plan for this query. With conventional index technology, J2 is only considered in planning the local T2–T1 join and therefore will miss this optimal global join plan.

This technique can be applied to both a single-table join index and a multi-table join index. When used for a single-table join index, this technique can be used to implement a hashed index that can provide great performance improvement to certain kinds of joins. When used for multi-table join index, this technique allows a database administrator to use the same join index to provide the benefits of pre-computed joins to different user queries without having to pay the overhead of a very large index structure.

For example, given the three tables, T1, T2, and T3 defined above and a multi-table join index that is defined using rowids to provide access paths to T1 and T2:

Create join index J3 as
Select T1.b1, T2.a2, T2.c2,
T1.rowid (named T1rowid), T2.rowid (named T2rowid)
From T1, T2
Where T1.a1=T2.a2
Primary Index (b1);
the following user query:
Select T2.b2, T2.c2, T1.a1, T1.c1, . . .
From T1, T2, T3
Where T1.a1=T2.a2 and T1.b1=T3.a3
T2.c2<100;
is rewritten as:
Select T2.b2, T2.c2, T1.a1, T1.c1, . . .
From T1, T2, T3, J3
Where J3.b1=T3.a3 and
J3.T1rowid=T1.rowid and J3.T2rowid=T2.rowid and
J3.c2<100;

In this case, J3 is non-covering join index because it does not include all the columns required by the query (T1.c1 and T2.b2, at least, are missing) but includes all or some of the base table columns that are referenced in the WHERE clause, and it includes the rowid fields from T1 and T2. To incorporate the non-covering join index into the query, the technique added the non-covering join index (J3) to the FROM clause without removing its base tables T1 and T2, and modified the query's WHERE clause by (1) mapping the partially covered conditions to the join index (J3.b1=T3.a3, J3.c2<100 in place of T1.b1=T3.a3 and T2.c2<100, respectively), and (2) adding join back conditions (J3.T1rowid=T1.rowid, J3.T2rowid=T2.rowid).

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A method for optimizing a SQL query, in which the SQL query includes a WHERE clause and a FROM clause, where the method includes
    evaluating whether a non-covering join index partially but not completely covers the query, and if it does
        adding the join index to the FROM clause of the query without removing the partially covered base tables;
        modifying the WHERE clause of the query by:
            (1) mapping a query condition to the join index for its partially covered base tables; and
            (2) adding a join back condition from the join index to a base table from which the join index was formed.

2. The method of claim 1 further including
    evaluating the cost of a plurality of different join paths to implement the query, the difference in at least some of the join paths being at least partially attributed to an order of the join back condition in the respective join paths; and
    selecting the least costly of the plurality of different join paths.

3. The method of claim 1, in which the non-covering join index is recognized to have a unique column that can be used to join back to a base table of the join index efficiently, and adding the join back condition includes
    adding a predicate to the WHERE clause which tests for equality between the unique column of the base table and the corresponding unique column included in the join index.

4. The method of claim 3 in which the unique column is a rowid column.

5. The method of claim 3 in which the unique column is a primary index column.

6. The method of claim 3 in which the unique column is a secondary index column.

7. The method of claim 1, in which (a) the FROM clause of the query specifies one or more tables, including one or more base tables, (b) the entire query references a entire-query set of columns from the one or more base tables of the join index, (c) the WHERE clause of the query references a whereclause set of columns from the one or more base tables of the join index, (d) the join index is defined by selecting columns from the one or more base tables, the method further includes
    recognizing that the non-covering join index provides partial but not complete coverage by determining that the join index does not contain all of the entire-query set of columns; and determining that the join index contains a subset of the where-clause set of column.

8. The method of claim 7 where recognizing that the non-covering join index provides partial but not complete coverage includes
    determining that the join index includes a primary key for each of the one or more base tables from which the join index was formed that are not completely covered.

9. The method of claim 8 where the primary key included in the join index for at least one of the base tables is a rowid.

10. The method of claim 8 where the primary key included in the join index for at least one of the base tables is a unique primary index.

11. The method of claim 8 where the primary key included in the join index for at least one of the base tables is a unique secondary index.

12. A database system for accessing a database, the database system including
    a massively parallel processing system including
        one or more nodes;
        a plurality of CPUs, each of the one or more nodes providing access to one or more CPUs;
        a plurality of virtual processes each of the one or more CPUs providing access to one or more processes;
    each process configured to manage data stored in one of a plurality of data-storage facilities; an optimizer for optimizing a plan for executing a query, the query including a FROM clause and a WHERE clause, the optimizer including
        a process for evaluating whether a non-covering join index partially but not completely covers the query, and if it does,
            adding the join index to the FROM clause of the query without removing the partially covered base tables;
            modifying the WHERE clause of the query by:
                (1) mapping a query condition to the join index for its partially covered base tables; and
                (2) adding a join back condition from the join index to a base table from which the join index was formed.

13. The database system of claim 12 where the optimizer further includes
    a process for evaluating the cost of a plurality of different join paths to implement the query, the difference in at least some of the join paths being at least partially attributed to an order of the join back condition in the respective join paths; and
    a process for selecting the least costly of the plurality of different join paths.

14. The database system of claim 12, in which the non-covering join index is recognized to have a unique column that can be used to join back to a base table of the join index efficiently, and adding the join back condition includes
    adding a predicate to the WHERE clause which tests for equality between the unique column of the base table and the corresponding unique column included in the join index.

15. The database system of claim 14 in which the unique column is a rowid column.

16. The database system of claim 14 in which the unique column is a primary index column.

17. The database system of claim 14 in which the unique column is a secondary index column.

18. The database system of claim 12, in which (a) the FROM clause of the query specifies one or more tables, including one or more base tables, (b) the entire query references a entire-query set of columns from the one or more base tables of the join index, (c) the WHERE clause of the query references a where-clause set of columns from the one or more base tables of the join index, (d) the join index is defined by selecting columns from the one or more base tables, the optimizer further includes
    a process for recognizing that the non-covering join index provides partial but not complete coverage by
        determining that the join index does not contain all of the entire-query set of columns;
        determining that the join index contains a subset of the where-clause set of column.

19. The database system of claim 18 where the process for recognizing that the non-covering join index provides partial but not complete coverage includes
    determining that the join index includes a primary key for each of the one or more base tables from which the join index was formed that are not completely covered.

20. The database system of claim 19 where the primary key included in the join index for at least one of the base tables is a rowid.

21. The database system of claim 19 where the primary key included in the join index for at least one of the base tables is a unique primary index.

22. The database system of claim 19 where the primary key included in the join index for at least one of the base tables is a unique secondary index.

23. A computer program, stored on a tangible storage medium, for use in optimizing a query including a FROM clause and a WHERE clause, the program including executable instructions that cause a computer to
    evaluate whether a non-covering join index partially but not completely covers the query, and if it does
    add the join index to the FROM clause of the query without removing the partially covered base tables;
    modify the WHERE clause of the query by:
        (1) mapping a query condition to the join index for its partially covered base tables; and
        (2) adding a join back condition from the join index to a base table from which the join index was formed.

24. The computer program of claim 23 further including executable instructions that cause a computer to
    evaluate the cost of a plurality of different join paths to implement the query, the difference in at least some of the join paths being at least partially attributed to an order of the join back condition in the respective join paths; and
    select the least costly of the plurality of different join paths.

25. The computer program of claim 23, in which the non-covering join index is recognized to have a unique column that can be used to join back to a base table of the join index efficiently, and, when adding the join back condition, the computer
    adds a predicate to the WHERE clause which tests for equality between the unique column of the base table and the corresponding unique column included in the join index.

26. The computer program of claim 25 in which the unique column is a rowid column.

27. The computer program of claim 25 in which the unique column is a primary index column.

28. The computer program of claim 25 in which the unique column is a secondary index column.

29. The computer program of claim 23, in which (a) the FROM clause of the query specifies one or more tables, including one or more base tables, (b) the entire query references a entire-query set of columns from the one or more base tables of the join index, (c) the WHERE clause of the query references a where-clause set of columns from the one or more base tables of the join index, (d) the join index is defined by selecting columns from the one or more base tables, the computer program further includes executable instructions that cause the computer to
    recognize that the non-covering join index provides partial but not complete coverage by
        determining that the join index does not contain all of the entire-query set of columns;
        determining that the join index contains a subset of the where-clause set of column.

30. The computer program of claim 29 where, when recognizing that the non-covering join index provides partial but not complete coverage, the computer
    determines that the join index includes a primary key for each of the one or more base tables from which the join index was formed that are not completely covered.

31. The computer program of claim 30 where the primary key included in the join index for at least one of the base tables is a rowid.

32. The computer program of claim 30 where the primary key included in the join index for at least one of the base tables is a unique primary index.

33. The computer program of claim 30 where the primary key included in the join index for at least one of the base tables is a unique secondary index.

* * * * *